United States Patent

Asmussen

[15] 3,705,417

[45] Dec. 5, 1972

[54] PULSE RATIO DETECTOR

[72] Inventor: Daniel R. Asmussen, Kirkland, Wash. 98033

[73] Assignee: Tel-Tone Corporation, Kirkland, Wash.

[22] Filed: Dec. 16, 1971

[21] Appl. No.: 208,606

[52] U.S. Cl. ..................307/234, 307/232, 307/233, 307/246, 307/252 F, 307/294, 307/295, 328/139, 328/140

[51] Int. Cl. ..............................................H03k 5/20

[58] Field of Search......................307/228, 231–236, 307/246, 262, 271, 252 F, 294, 295; 328/109, 111, 112, 118, 135, 139, 140, 151; 324/140 D, 181

[56] References Cited

UNITED STATES PATENTS

| | | | |
|---|---|---|---|
| 3,473,133 | 10/1969 | Hummel | 307/233 X |
| 3,624,410 | 11/1971 | Bruckert | 307/234 |
| 3,641,397 | 2/1972 | Elliot et al. | 307/252 F X |
| 3,660,686 | 5/1972 | Muskovac | 307/228 X |

*Primary Examiner*—Stanley D. Miller, Jr.
*Attorney*—Christensen & Sanborn

[57] ABSTRACT

A circuit is provided which can determine the time duration ratio, within a predetermined range, of the cycle portions of an input signal. First and second capacitors are connected to a programmable unijunction transistor, respectively, between the anode gate and an electrical point and between the anode and the same electrical point. Separate charging networks are in circuit with the two capacitors. A transition of the incoming signal is differentiated and used to momentarily enable a circuit element to discharge the first capacitor which then commences to recharge at a rate determined by the network constants. While the incoming signal remains in the state to which it has switched, the second capacitor is held in the discharged state by another logic element. However, when the input signal switches to its alternate state during a second cycle portion, the charging circuit to the first capacitor is opened, and the clamp is removed from the second capacitor which begins to charge at a rate determined by the time constants of its charging network. If the first cycle portion is substantially shorter in duration than the second cycle portion, the programmable unijunction transistor will fire at an intermediate time during the second cycle portion. If, on the other hand, the first cycle portion is substantially longer, the programmable unijunction transistor will not reach firing potential at all. If the cycle portions are about the same in duration, the unijunction transistor will fire near the end of the second cycle portion, and a signal developed therefrom is logically combined with a clock signal derived from the next succeeding transition of the input signal to store the analysis of the entire cycle by setting a flip-flop which is otherwise reset by either of the asymmetrical conditions. Frequency range and ratios other than 1:1 can be analyzed by correspondingly selecting the circuit time constants.

7 Claims, 4 Drawing Figures

INVENTOR.
DANIEL R. ASMUSSEN

BY Christensen & Sanborn

ATTORNEYS

PULSE RATIO DETECTOR

BACKGROUND OF THE INVENTION

This invention relates to the electronic arts, and more particularly, to a system for analyzing each cycle of an input signal to determine and store the fact that the analyzed cycle does or does not have a cycle portion time duration ratio within a predetermined range.

In many data transmission systems, valid signals can be distinguished from noise if a determination can be made of the ratio between the time duration of a first cycle portion and the time duration of the second cycle portion. By way of example, one may refer to application Ser. No. 867,788, filed Oct. 20, 1969, now U.S. Letters Pat. No. 3,636,270, by Alexander McIntosh et al. for HIGHLY-SELECTIVE FREQUENCY DETECTION SYSTEM, which reference discloses a communication system wherein such a determination is made by means which may be considered exemplary of the prior art. Briefly, the positive and negative cycle portions were used to charge and discharge a capacitor such that the average voltage appearing across the capacitor could be analyzed by comparison with a reference voltage. A fundamental disadvantage of this approach is that, in practice, integration over several cycles is required before a meaningful determination of the ratio could be made. Further, noise with certain characteristics could charge and discharge the capacitor in such a manner as to provide a false indication of validity. It will be apparent to those skilled in the art that if evaluation of each and every input cycle could be achieved, a very high degree of accuracy in making a validity determination would become possible.

It is therefore a broad object of this invention to provide an improved circuit for examining the pulse width ratio of the cycle portions of an input signal.

It is a more specific object of this invention to provide a circuit which examines the duration of the cycle portions of each cycle of an input signal and records an indication as to whether the cycle portions fall within a predetermined ratio of respective time durations.

It is a further object of this invention to provide such a circuit which is relatively simple and economical to fabricate, yet completely reliable.

SUMMARY OF THE INVENTION

Briefly, the more positive and the more negative cycle portions are separated and used to control the potential to which first and second capacitors charge by controlling the respective charge durations. One capacitor presents a potential to the anode gate of a programmable unijunction transistor, and the other capacitor presents a potential to the anode of the programmable unijunction transistor. These potentials determine whether the programmable unijunction transistor will fire during the second cycle portion and, if it does fire, the firing instant. If the firing time is near the end of the second cycle portion, a logic pulse developed therefrom is combined with a clock pulse derived from the next succeeding transition into a first cycle portion to set a flipflop indicating validity. Any other condition will apply a reset pulse to the flipflop when the clock pulse appears.

DESCRIPTION OF THE DRAWINGS

The subject matter of the invention is particularly pointed out and distinctly claimed in the concluding portion of the specification. The invention, however, both as to organization and method of operation, may best be understood by reference to the following description taken in connection with the accompanying drawing of which:

DESCRIPTION OF A PREFERRED EMBODIMENT

Figure 1:
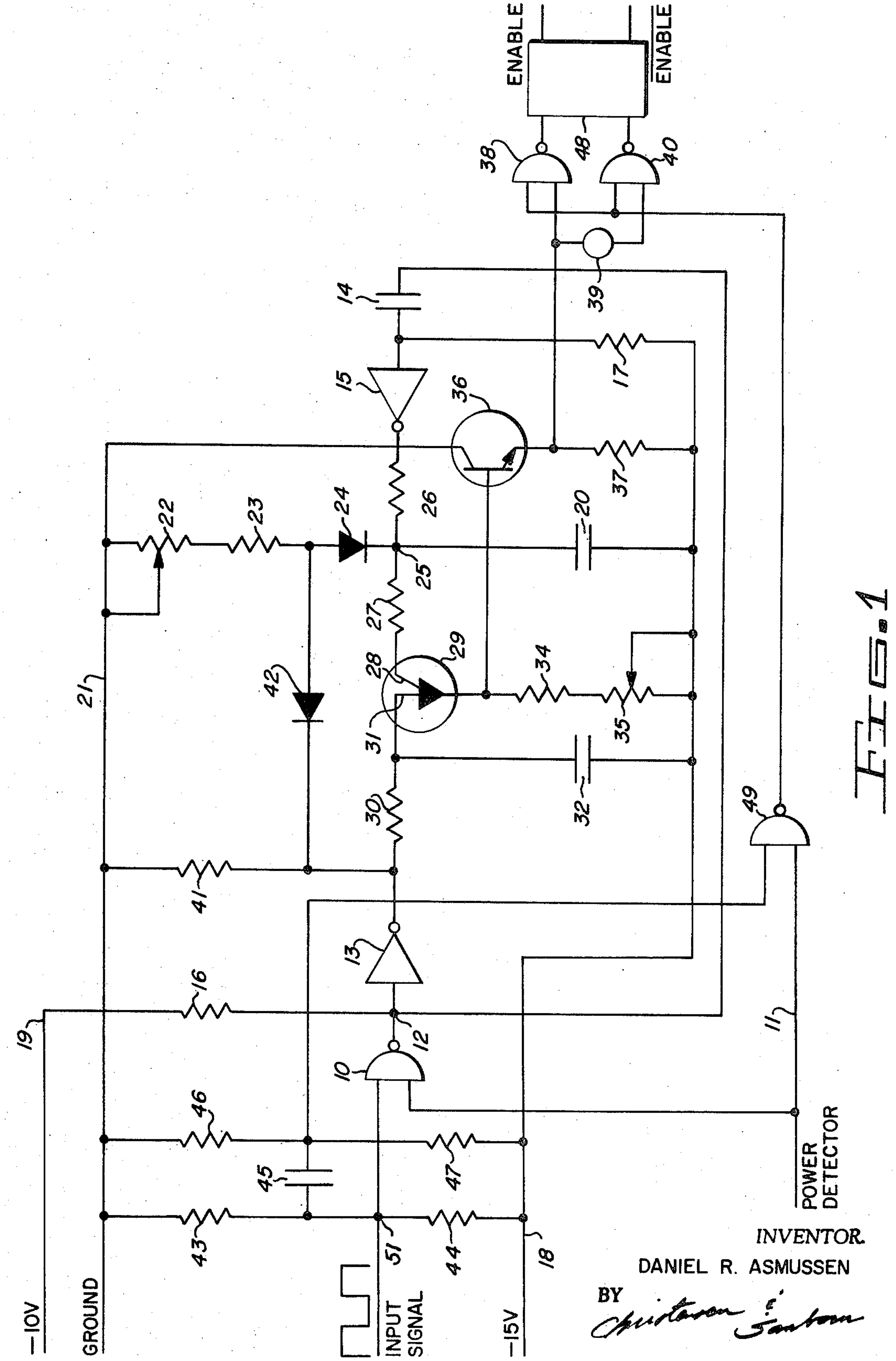
FIG. 1 is a schematic logic diagram illustrating a presently preferred embodiment of the invention.

Referring now to FIG. 1, the signal to be analyzed is applied as one input to NAND-gate 10 which has, as its other input, the signal appearing on a Power Detector line 11. Thus, when a logical 1 is present on the Power Detector line 11, the input signal passes through the NAND-gate 10 and appears logically inverted at the electrical point 12. It will be observed that the electrical point 12 is coupled to the input terminals of a first inverting amplifier 13 and also to one plate of a capacitor 14 which has its complementary plate connected to the input terminals of a second inverting amplifier 15. Resistors 16 and 17, connected, respectively, between the input terminals of the first inverting amplifier 13 and the −10 volt bus 19 and between the input terminals to the second inverting amplifier 15 and the −15 volt bus 18, serve a biasing function for the amplifiers. Additionally, resistor 17 forms a differentiating network with the capacitor 14.

A capacitor 20 is connected in a series circuit between the ground bus 21 and the −15 volt bus 18, which series circuit includes an adjustable resistor 22, a fixed resistor 23, and a normally forward biased diode 24 as well as the capacitor 20. The electrical point 25 between the cathode of the diode 24 and the more positive plate of the capacitor 20 is connected through a resistor 26 to the output of the inverting amplifier 15 and through a resistor 27 to the anode-gate 28 of a programmable unijunction transistor 29.

Similarly, the output of the inverting amplifier 13 is connected through a resistor 30 to the anode 31 of the programmable unijunction transistor 29, and another capacitor 32 is connected between the anode 31 and the −15 volt bus 18. The cathode 33 of the programmable unijunction transistor 29 is connected to the −15 volt bus 18 through a fixed resistor 34 and a variable resistor 35 and is also directly connected to the base electrode of an NPN transistor 36. The emitter electrode of the transistor 36 is directly coupled as one input to a NAND-gate 38 and, through a logical inverter 39 which drives one input to another NAND-gate 40. The collector electrode of the transistor 36 is connected to the ground bus 21, and the emitter electrode is also connected through a resistor 37 to the −15 volt bus 18 such that those skilled in the art will recognize that the transistor 36 is utilized in the emitter follower configuration. A resistor 41 is connected between the output of the inverting amplifier 13 and the ground bus 21 for biasing purposes, and the cathode of a second diode 42 is also connected to the output of the amplifier 13. The anode of the diode 42 is connected to electrical point 50 which is also disposed between one end of the resistor 23 and the anode of the diode 24.

The d-c average potential of the input signal is generally established by the biasing resistors 43 and 44, the junction thereof determining electrical point 51 between ground and −15 volts. Similarly, resistors 46 and 47, connected between the ground bus 21 and −15 volt bus 18, establish a logical reference point for one input to the NAND-gate 49 which is also driven, at its other input, by the Power Detector line 11. The input signal is a-c coupled to the other input of the NAND-gate 49, common with the junction between the resistors 46 and 47 by means of the capacitor 45.

It will be observed that the output from the NAND-gate 49 is connected to simultaneously enable or disable NAND-gates 38 and 40 in parallel and that the transistor 36, connected in the emitter follower configuration, drives the second inputs to the NAND-gates 38 and 40 in opposite polarities. Thus, as will be explained in further detail below, either the NAND-gate 38 or the NAND-gate 40 may be enabled to switch the Enable Flipflop 48 to either the set or reset state according to the time duration characteristics of the input signal cycle portions.

Figure 4:
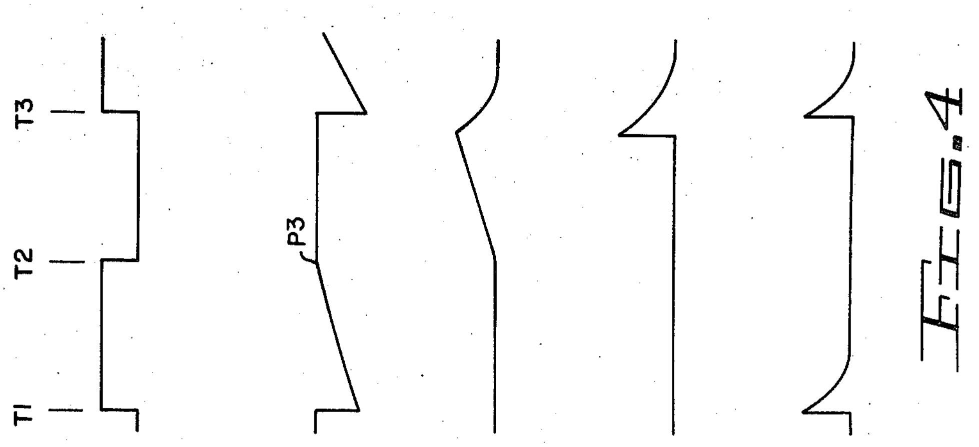
FIG. 4 illustrates the operation of the circuit when the cycle portions are very nearly symmetrical.
Figure 3:
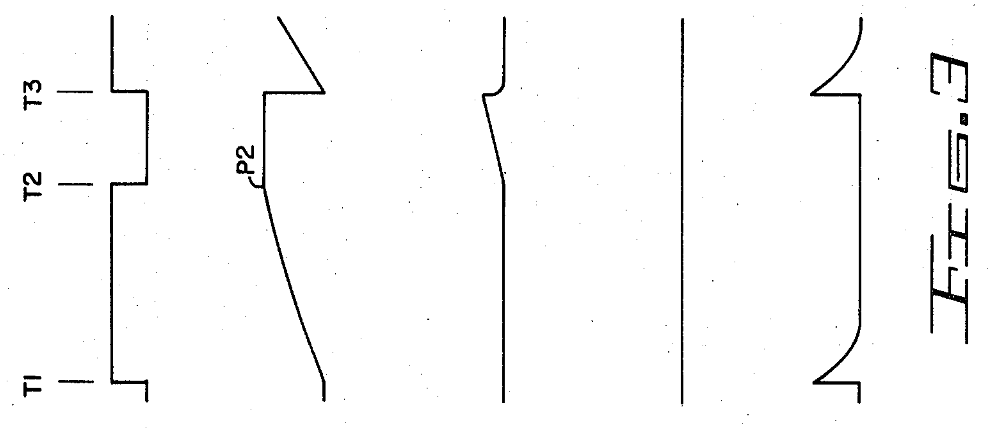
FIG. 3 is a timing diagram illustrating the operation of the circuit of FIG. 1 when a first cycle portion is much longer in duration than the second cycle portion.
Figure 2:
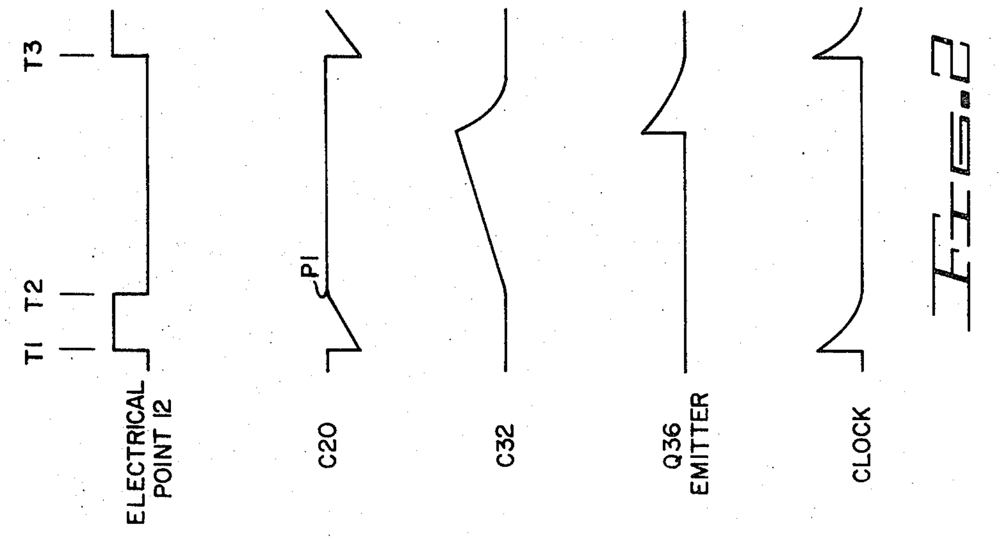
FIG. 2 is a timing diagram illustrating the operation of the circuit of FIG. 1 when a first cycle portion is much shorter in duration then the second cycle portion.

The operation of the circuit illustrated in FIG. 1 under three possible conditions may best be understood with simultaneous reference to the timing diagrams of FIGS. 2, 3 or 4. However, the fundamental sequence of operation is the same for all conditions and will be explained first with reference only to FIG. 1. A logical 1 appearing on the Power Detector bus 11 functions simply to enable operation of the circuit. As previously noted, with a logical 1 at the power detector input to the NAND-gate 10, the input signal appearing at electrical point 51, which will previously have been squared and clamped to 1 and 0 logic levels by any suitable means, will appear in inverted form at electrical point 12 which is the output of the NAND-gate 10. During a quiescent period when the Power Detector bus presents a logical 0, the output of the inverting amplifier 15 appears as an open circuit, and therefore the capacitor 20 charges through the resistors 22 and 23 and the forward biased diode 24. The charge rate, of course, may be determined by selecting components of suitable value and also, within a modest range, by adjusting the resistor 22. When the input signal is undergoing a transition in the negative direction, the corresponding positive going transient appearing at electrical point 12 is differentiated by the capacitor 14 and the resistor 17 to momentarily drive the inverting amplifier 15 in such a manner that its output goes from an open condition to −15 volts thereby permitting the capacitor 20 to discharge through current limiting resistor 26 to set up an initial condition. This action takes place very quickly with reference to the signal frequency contemplated and therefore only occupies a very small portion of a legitimate cycle portion time.

When the transient drops below the threshold level at the input to the inverting amplifier 15 the output thereof again appears as an open circuit, and the capacitor 20 begins to charge again at its natural rate and continues to charge as long as the electrical point 12 does not undergo a negative transition. Simultaneously, for the entire cycle portion, the inverting amplifier 13 presents −15 volts to the junction between the resistors 30 and 41 to discharge any charge on the capacitor 32 which may have accumulated during quiescent conditions through the current limiting resistor 30.

When the signal at the electrical point 12 switches to its more negative potential, the output of the inverting amplifier 13 opens and the diode 42 becomes forward biased to back bias the diode 24 in order to hold the charge on the capacitor 20 to the level it reached during its charging period, and it will be apparent that the potential appearing across the capacitor 20 at the time is meaningfully related to the length of time a signal at the electrical point 12 was at its more positive potential. This potential on the capacitor 20 is now held on the anode-gate 28 of the programmable unijunction transistor 29. At the same time, because the output of the inverter amplifier 13 has taken on the characteristics of an open circuit, the capacitor 32 begins to charge at a rate determined by its value and the value of the resistors 41 and 30. The capacitor 32 continues to charge during the entire period during which electrical point 12 is at its more negative potential, and the potential of the more positive plate of the capacitor 32 appears directly on the anode electrode of the programmable unijunction transistor 29.

If, in accordance with conditions to be set forth below, the programmable unijunction transistor fires, the potential appearing at its cathode electrode is sufficient to turn on the transistor 36 which therefore delivers a logical 1 signal to the input of the NAND-gate 38 to which it is connected and also to the input of the logical inverter 39 which responds by impressing a logical 0 to the input of the NAND-gate 40 to which it is connected. If the programmable unijunction transistor 29 does not fire, of course, the conditions applied to the NAND-gates 38 and 40 from the transistor 36 are the opposite and remain so unless and until the unijunction transistor subsequently fires.

It will be observed that the input signal appearing at electrical point 51 is coupled through a differentiating circuit comprising the capacitor 45 and the resistors 46 and 47 to the NAND-gate 49 which is otherwise enabled by a logic 1 from the Power Detector bus 11. The voltage divider comprising the resistors 46 and 47 serve to normally provide a logic 1 input to the NAND-gate 49 which therefore has, as its output, a logic 0 which holds NAND-gate 38 and 40 normally disabled. However, when the input signal, at the electrical point 51, switches from its more positive potential to its more negative potential, a logic 0 pulse is applied to NAND-gate 49 which results in a logic 1 pulse being applied to one input to each of the NAND-gates 38 and 40. As a result, the Enable Flipflop 48 will either be set or reset depending upon the state of the signal from the transistor 36 applied to the other inputs to the NAND-gates 38 and 40. Of course, the Enable Flipflop 48 may remain in its previous state if the conditions indicate that state is still correct.

Referring now to FIG. 2 as well as FIG. 1, the conditions are presented in which the positive cycle portion, referenced to electrical point 12, is too narrow to fall within the acceptable range of width ratios. Thus, at T1, electrical point 12 translates from its more negative potential to its more positive potential and capacitor 20 is first rapidly discharged and then proceeds to charge until T2 at which time it will carry a potential P1 which is held on the anode gate 28 of the programmable unijunction transistor 29. At T2, the input signal at electrical point 12 translates from its more positive potential to its more negative potential which brings about a charge cycle for the capacitor 32 for the rest of the cycle being analyzed. Because this more negative half cycle portion is much longer in duration then the first cycle portion, capacitor 20 charges to a higher potential then would be expected for symmetry or near symmetry of the cycle portions. At T3, which corresponds to the next succeeding positive going transition of the input signal at electrical point 12, a logic 1 pulse from the NAND-gate 49 is applied to both the NAND-gates 38 and 40, but only the NAND-gate 40 will be enabled to deliver a logic 0 pulse to the Enable Flip-flop 48 because the programmable unijunction transistor 29 fired at T3 turning on the transistor 36 intermediate through the second cycle portion. However, the transistor 36 will only remain on for a period determined by the value of the discharge circuit for capacitor 32 which includes the programmable unijunction transistor 29 and the resistors 34 and 35. Thus, transistor 36 will be turned off once again well before the termination of the second cycle portion. As a result Enable Flipflop 48 is reset, if it were previously set, or remains reset to store the fact that the just analyzed cycle was asymmetrical, when the clock pulse occurs.

Consider now FIG. 3 which illustrates a second condition in which the first cycle portion, positive going at T1 at electrical point 12, is much longer in duration than the remainder of the cycle. In that event, the capacitor 20 charges to potential P2 which is held at the anode gate 28 of the programmable unijunction transistor 29 starting at T2. At T2, the capacitor 32 commences to charge, but by T3, at which time NAND-gates 38 and 40 are interrogated, the firing potential of the programmable unijunction transistor 29 will never have been attained, and the transistor 36 remains off. As a result, only the NAND-gate 40 delivers a logic 0 pulse to the Enable Flipflop 48 which is reset if it were previously set or simply remains reset.

Reference may now be taken to FIG. 4 which illustrates the sequence of operation when the first and second cycle portions are reasonably equivalent in time duration. At T1, the capacitor 20 charges for the first cycle portion and reaches a potential P3 which is held during the second cycle portion as capacitor 32 charges. When capacitor 32 reaches the firing potential of the programmable unijunction transistor 29, the programmable unijunction transistor 29 fires to discharge the capacitor 32 and turn on the transistor 36 for a time corresponding to the time constants of the various components as previously discussed. If the transistor 36 is still sufficiently on when the logic 1 pulse from the output from the NAND-gate 49 is impressed upon the NAND-gates 38 and 40, the NAND-gate 38 will be enabled to deliver a logic 0 pulse to the set input of the Enable Flipflop 48 which will therefore set (or remain set) to indicate that the just analyzed cycle was symmetrical within the tolerances set up in the circuit.

The resistor 22 is utilized to effect close adjustment of the charge rate of the capacitor 20, and the resistor 35 provides control over the discharge rate of the capacitor 32. The latter adjustment affects the time during which transistor 36 is sufficiently on to partially enable NAND-gate 38 and thus serves as a tolerance adjustment for the acceptable degree of asymmetry.

Those skilled in the art will appreciate that the components in the charging networks are selected in accordance with the expected frequency of valid incoming signals and the ratio, which may not necessarily be 1:1, of valid signals.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environment and operating requirements without departing from those principles.

I claim:

1. A circuit for analyzing the pulse width ratio of the cycle portions of an input signal comprising:

A. a discharge devise having an anode, a cathode, and a control electrode;

B. a first capacitor coupled between said control electrode and a first electrical point;

C. a second capacitor coupled between said anode and said first electrical point;

D. means for maintaining said first electrical point at a reference potential;

E. a first charging network connected between a charging source and said first capacitor;

F. a second charging network connected between said charging source and said second capacitor G. means responsive to a transition of said input signal in a first direction to momentarily discharge and said first capacitor such that it commences to charge from a substantially discharged condition through said first charging network;

H. means responsive to the input signal condition after a transition of the input signal in the first direction and before a transition of the input signal in the second direction to maintain said second capacitor discharged;

I. first means responsive to a transition of the input signal in the second direction for inhibiting further charging of said first capacitor and holding the potential thereon;

J. second means responsive to a transition of the input signal in the second direction for permitting said second capacitor to commence charging through said second charging network, said second capacitor discharging through said discharge device if and when the firing potential thereof is reached;

K. means responsive to a transition of the input signal in the first direction for developing a clock pulse have a leading edge coincident therewith; and L. coincidence means for determining whether said discharge means fires within a maximum predetermined time span prior to the occurrence of said clock pulse.

2. The circuit of claim 1 which further includes latch means responsive to a determination by said coincidence means that said discharge means has fired within said predetermined time span for storing the fact thereof by assuming a first state, said latch means also being responsive to a determination by said coincidence means that said discharge means has not fired within said predetermined time span for storing the fact thereof by assuming a second state.

3. The conduit of claim 2 in which said first charging network includes a first, normally forward biased diode, and said first means responsive to a transition of the input signal in the second direction includes means for back biasing said first diode.

4. The circuit of claim 3 in which said means for back biasing said first diode includes a second, clamp diode coupled to back bias said first diode during the cycle portion between the time said input signal undergoes a transition in the second direction and a subsequent transition in the first direction.

5. The circuit of claim 4 in which said discharge device consists of a programmable unijunction transistor.

6. The circuit of claim 4 in which said coincidence means includes:

A. first and second logic gates, each of said gates having first and second inputs and an output;

B. developing means responsive to the firing of said discharge device for issuing an enabling logic signal;

C. means directly coupling said developing means to said first input of said first gate;

D. inverter means coupling the output from said developing means in logically inverted form to said first input of said second gate; and E. means coupling said clock pulse to said second inputs to each of said first and second gates.

7. The circuit of claim 6 in which said latch means assumes said first state when said first gate is temporarily enabled and assumes said second state when said second gate is temporarily enabled.

* * * * *

PO-1050
(5/69)

UNITED STATES PATENT OFFICE
CERTIFICATE OF CORRECTION

Patent No. 3,705,417 Dated December 5, 1972

Inventor(s) Daniel R. Asmussen

It is certified that error appears in the above-identified patent and that said Letters Patent are hereby corrected as shown below:

Claim 1 G, line 42, delete "and".

Claim 3, line 10, change "conduit" to --circuit--.

Signed and sealed this 8th day of May 1973.

(SEAL)
Attest:

EDWARD M. FLETCHER, JR.
Attesting Officer

ROBERT GOTTSCHALK
Commissioner of Patents